United States Patent
Kato et al.

(10) Patent No.: US 6,170,670 B1
(45) Date of Patent: Jan. 9, 2001

(54) METHODS OF AND APPARATUS FOR FEEDING GRANULAR MATERIAL

(75) Inventors: Yasuhiro Kato, Hyogo-ken; Daisuke Nakamura; Tatsuya Kawajiri, both of Himeji, all of (JP)

(73) Assignee: Nippon Shokubai Co., Ltd., Osaka (JP)

( * ) Notice: Under 35 U.S.C. 154(b), the term of this patent shall be extended for 0 days.

(21) Appl. No.: 09/142,179

(22) PCT Filed: Jan. 21, 1998

(86) PCT No.: PCT/JP98/00253

§ 371 Date: Sep. 23, 1998

§ 102(e) Date: Sep. 23, 1998

(87) PCT Pub. No.: WO98/32529

PCT Pub. Date: Jul. 30, 1998

(30) Foreign Application Priority Data

Jan. 23, 1997 (JP) .................................................... 9-010646

(51) Int. Cl.[7] ............................. B07B 1/34; B65G 47/04; B65G 47/18; B65G 17/36
(52) U.S. Cl. ........................ 209/325; 209/331; 209/375; 198/530; 198/540; 198/550.01; 198/566
(58) Field of Search .................................... 198/533, 540, 198/550.01, 566; 209/325, 331, 333, 375

(56) References Cited

U.S. PATENT DOCUMENTS

| | | | |
|---|---|---|---|
| 2,333,435 | * 11/1943 | Muskat | 198/540 |
| 2,389,566 | * 11/1945 | Thomas | 198/540 |
| 3,083,811 | * 4/1963 | Musschoot | 198/540 |
| 4,276,915 | * 7/1981 | Argyll | 141/98 |
| 4,402,643 | * 9/1983 | Lytton et al. | 414/160 |
| 4,596,327 | * 6/1986 | Yamano | 198/533 |
| 4,651,868 | * 3/1987 | Sticht | 198/540 |
| 5,485,963 | * 1/1996 | Walto et al. . | |
| 6,032,828 | * 3/2000 | Gicza et al. | 222/1 |

FOREIGN PATENT DOCUMENTS

| | | |
|---|---|---|
| 60-112338 | 7/1985 | (JP) . |
| 1-33152 | * 10/1989 | (JP) . |
| 3-9770 | * 2/1991 | (JP) . |
| 8-133203 | * 5/1996 | (JP) . |

* cited by examiner

Primary Examiner—Donald P. Walsh
Assistant Examiner—Brett C. Martin
(74) Attorney, Agent, or Firm—Oblon, Spivak, McClelland, Maier & Neustadt, P.C.

(57) ABSTRACT

An apparatus for feeding a granular catalyst to a destination such as a reactor at a constant feeding rate uniformly charges the catalyst material into the device. The granular catalyst is loaded into individual compartments of a hopper and is ejected at a discharge rate controlled by a gate. When a vibrator is activated, a trough is caused to vibrate in its obliquely upward direction and the granular material in the trough is smoothly conveyed toward outlets of granular material passages formed in the trough, and is introduced to reaction tubes of the reactor via sieves. Powdery waste of the granular catalyst produced by the vibration of the trough is removed by letting it fall the sieves made in the granular material passages.

22 Claims, 4 Drawing Sheets

METHODS OF AND APPARATUS FOR FEEDING GRANULAR MATERIAL

TECHNICAL FIELD

The present invention pertains to methods of and apparatus for feeding various kinds of granular material such as a granulated catalyst which may be globular, cylindrical or rectangular in shape, for instance, to a destination such as a reactor.

PRIOR ART

A known example of such granular material feeding apparatus is a catalyst charger which is disclosed in Japanese Unexamined Patent Publication No. 59-139923. As can be seen from a plan view of FIG. 5A and an elevational view of FIG. 5B, the catalyst charger comprises hoppers 50 for holding a granular catalyst, electromagnetic feeders 51 disposed close to discharge openings of the individual hoppers 50, each electromagnetic feeder 51 including an electromagnetic feeder drive 51a and a trough 51b, funnels 52 located at downstream ends of the individual electromagnetic feeders 51, and pipes 53 connecting the individual funnels 52 to reaction tubes.

In the aforementioned construction, the granular catalyst discharged from the hoppers 1 is caused to move on the troughs 51b and drop into the individual funnels 52 by vibrating the individual electromagnetic feeders 51, in which the feeding rate of the granular catalyst can be varied by adjusting a voltage applied to each electromagnetic feeder drive 51a. The electromagnetic feeders 51 are supported by springs 55 on a table 54.

This construction serves to prevent a so-called bridging which would occur when a large amount of granular catalyst is supplied at a time, and this makes it possible to uniformly charge the granular catalyst and significantly reduce the time required for charging operation.

One problem encountered with such conventional catalyst chargers is that it is difficult to precisely control the feeding rate of a granular catalyst because the feeding rate depends primarily on the frequency of vibration of each electromagnetic feeder. Another problem of the conventional catalyst chargers is that their granular catalyst transfer mechanisms are rather complicated due to the need for employing a plurality of electromagnetic feeders. A yet another problem is that powdery waste of the granular catalyst could develop during operation and accumulates on troughs, making it difficult to smoothly feed the granular catalyst and causing variations in its feeding rate.

The invention is intended to overcome the foregoing problems of the conventional catalyst chargers. Accordingly, it is a major object of the invention to provide methods of and apparatus for feeding a granular material to a destination such as a reactor in a stable manner with the capability of adjusting its feeding rate by use of a simplified transfer mechanism.

SUMMARY OF THE INVENTION

According to the present invention, a method of feeding a granular material to a specific destination includes the steps of discharging the granular material loaded in a hopper onto a trough which is disposed approximately in a horizontal position and extends from the vicinity of a discharge port of the hopper, and conveying the granular material on the trough up to the destination by vibrating the trough, wherein the granular material is delivered to the destination at a constant feeding rate by controlling the frequency of vibration of the trough while regulating the rate at which the granular material is discharged from the hopper by adjusting the opening of a gate.

In this method of feeding the granular material, it is preferable to vibrate the trough in its obliquely upward direction.

In one form of the invention, an apparatus for feeding a granular material to a specific destination includes a hopper for storing a granular material, a trough which is disposed approximately in a horizontal position and extends from the vicinity of a discharge port of the hopper, and a vibrator for causing the trough to vibrate whereby the granular material discharged from a downstream end of the trough is delivered to the destination, wherein a gate is provided at the discharge port of the hopper for regulating the rate at which the granular material is discharged from the hopper.

In another form of the invention, a granular material feeding apparatus includes a hopper for storing a granular material, a trough which is disposed approximately in a horizontal position and extends from the vicinity of a discharge port of the hopper, and a vibrator for causing the trough to vibrate whereby the granular material discharged from a downstream end of the trough is delivered to the destination, wherein the hopper is provided with partitions for dividing its internal space into a plurality of storage compartments, wherein a gate is provided at the discharge port of the hopper for regulating the rate at which the granular material is discharged from the hopper, wherein the trough has in its interior the same number of parallel passages as the storage compartments, and wherein the parallel passages have guideways formed at their respective outlets for guiding masses of the granular material into pipes which communicate with a destination.

In either of the aforementioned granular material feeding apparatus of the invention, it is preferable that a sieve be formed slightly upstream of the outlet of the parallel passage for dropping powdery waste of the granular material produced during its feeding operation. It is also preferable to construct the apparatus such that the vibrator causes the trough to vibrate in its obliquely upward direction.

A granulated catalyst formed into a globular, cylindrical or rectangular shape is one example of the granular material to be handled by the methods and apparatus of the invention.

A typical example of a destination to which the granular material is supplied according to the present invention is a reactor such as those used for producing ethylene oxide, phthalic anhydrite, acrolein, acrylic acid, and so forth, where thousands or more of reaction tubes are provided in each reactor.

According to this invention, the feeding rate of a granular material can be controlled by raise/lower operation of the gate as well as by adjusting the vibration frequency of the vibrator. As a consequence, the granular material can be delivered or charged to a destination, such as a reactor, at a constant feeding rate.

BEST EMBODIMENTS OF THE INVENTION

The invention is now described referring to the appended drawings.

Figure 1A:
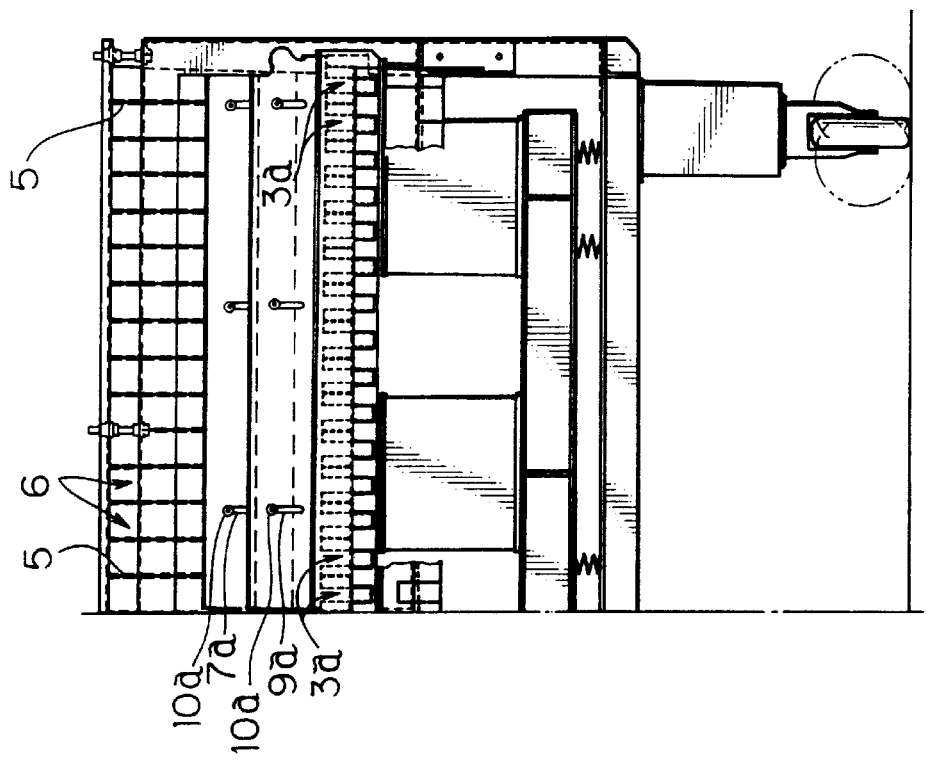
FIG. 1 is a diagram showing the construction of a catalyst charger according to the invention.

FIG. 1 is a diagram illustrating a catalyst charger as one form of granular material feeding apparatus for use in a method of feeding a granular material according to the invention. In FIG. 1, the catalyst charger 1 is placed above a reactor or above the tube sheet in the reactor which is not illustrated. Outlet pipes P are passed downward through an opening, such as a manhole, or directly, and the lower ends of the pipes P are individually connected to the top of corresponding reaction tubes.

The catalyst charger 1 comprises a hopper 2 for storing the granular material, that is, a granular catalyst, a trough 3 which is disposed approximately in a horizontal position and extends from the vicinity of discharge ports of the hopper 2, and a vibrator 4 for causing the trough 3 to vibrate, in which the granular catalyst discharged from a forward end portion of the trough 3 is fed into the pipes P which are connected to the reactor as a feeding destination.

Each component of the catalyst charger 1 is now described in detail.

The inside of the hopper 2 is divided into a plurality of compartments 6 by vertical partitions 5 which are arranged parallel to each other. A rear wall 2a of the hopper 2 is inclined to an angle greater than the angle of repose of the granular catalyst. Formed beneath a front wall 2b which is opposed to the rear wall 2a is a rectangular opening 2c which is located immediately above the trough 3.

Figure 2:
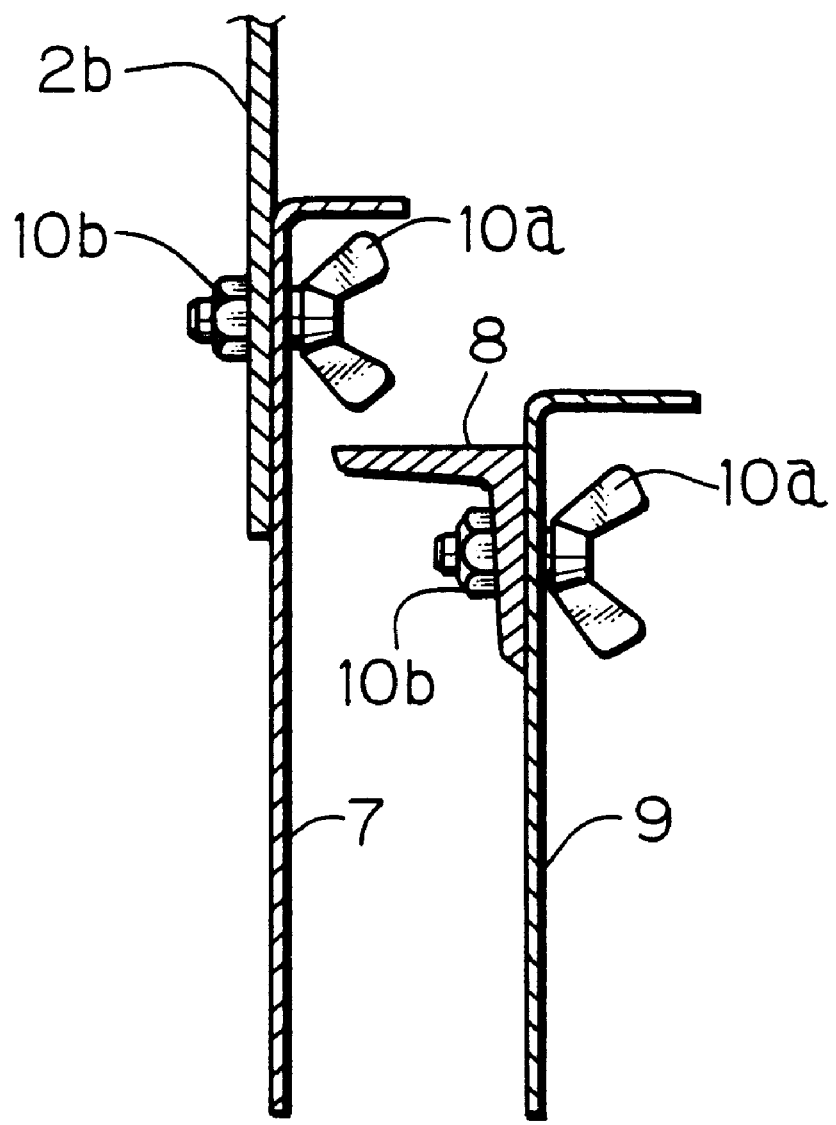
FIG. 2 is an enlarged fragmentary cross-sectional view showing the construction a gate portion shown in FIG. 1.

As shown in FIG. 2, the front wall 2b is fitted with a first plate 7 which can be moved up and down along the front wall 2b. Further, a vertically movable second plate 9 which can be moved up and down along a vertical surface of a beam 8 is mounted parallel to the first plate 7 downstream in the direction in which the granular catalyst is carried. The first plate 7 and the second plate 9 can be raised and lowered independently of each other and form together a gate for regulating the delivery rate of the granular catalyst. Thus, the first plate 7 and the second plate 9 are hereinafter referred to as gate plates 7 and 9, respectively.

Figure 1B:
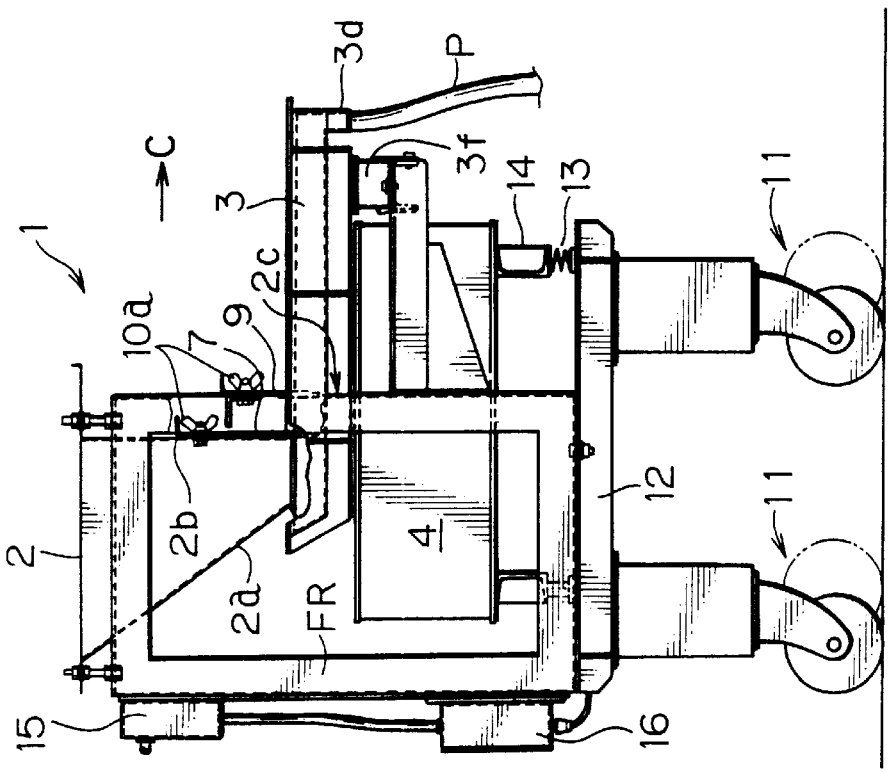

Slots 7a and 9a are formed in the gate plate 7 and the gate plate 9, respectively (see FIG. 1B). On the other hand, through holes are formed in the front wall 2b and the beam 8 at positions corresponding to the slots 7a and 9a. Wing screws 10a are inserted into the slots 7a and 9a and the through holes and tightened by nuts 10b. This arrangement makes it possible to securely set the individual gate plates 7, 9 at desired heights to provide a desired opening. The beam 8 is fixed to a frame FR which is installed on a mobile platform 12.

Referring again to FIG. 1, the trough 3 has a shallow boxlike structure in which a plurality of parallel passages 3a corresponding to the number of the compartments 6 are made so that the granular catalyst discharged from the compartments 6 is carried through the respective passages 3a. At an outlet of each passage 3a, there is formed a guideway for guiding the granular catalyst which has been carried along the passages 3a to the respective pipes P.

Figure 3:
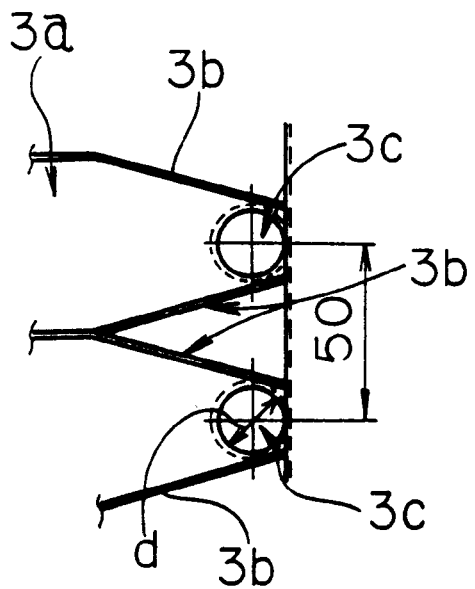
FIG. 3 is an enlarged fragmentary plan view showing the construction of downstream ends of granular catalyst passages shown in FIG. 1.

As shown in FIG. 3, each guideway is formed of a pair of side walls 3b which gradually reduces the width of each passage 3a approximately to the inside diameter d of the pipes P, a through hole 3c having the same diameter as the inside diameter d of the pipes P, and a cylindrical sleeve 3d (see FIG. 1A)having the same diameter as the inside diameter d of the through hole 3c and projecting downward from the lower end of the through hole 3C. Each sleeve 3d serves as a pipe coupling for connecting a corresponding pipe P. As the pipes P are used to connect the individual sleeves 3d to their corresponding reaction tubes disposed at different parts of the reactor, they should preferably be formed of a flexible material such as rubber, vinyl chloride or polyethylene so that they are connectable to the reaction tubes disposed at various parts of the reactor. In this embodiment, the interval between the through holes 3c is 50 mm.

Figure 4:
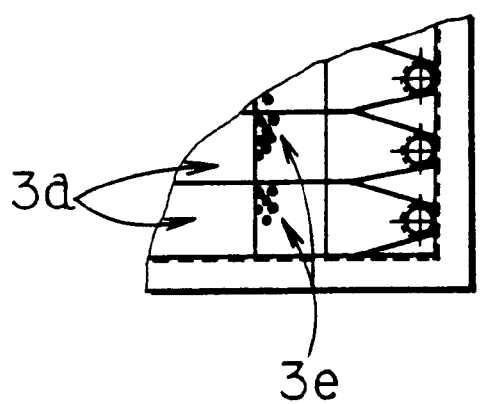
FIG. 4 is a fragmentary plan view showing the construction of a forward end portion of the trough shown in FIG. 1.
Figure 5A:
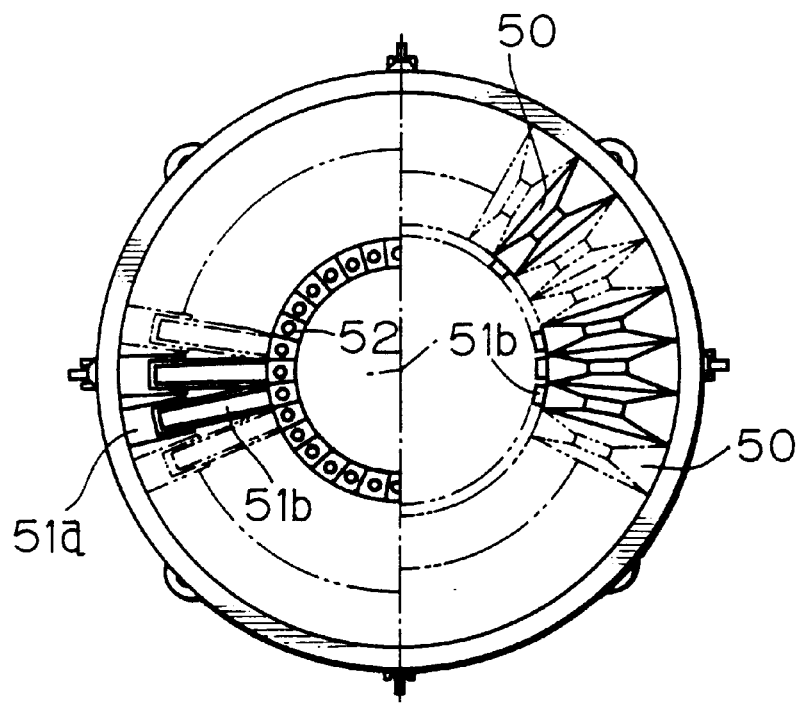
FIG. 5 is a diagram showing the construction of a conventional catalyst charger.
Figure 5B:
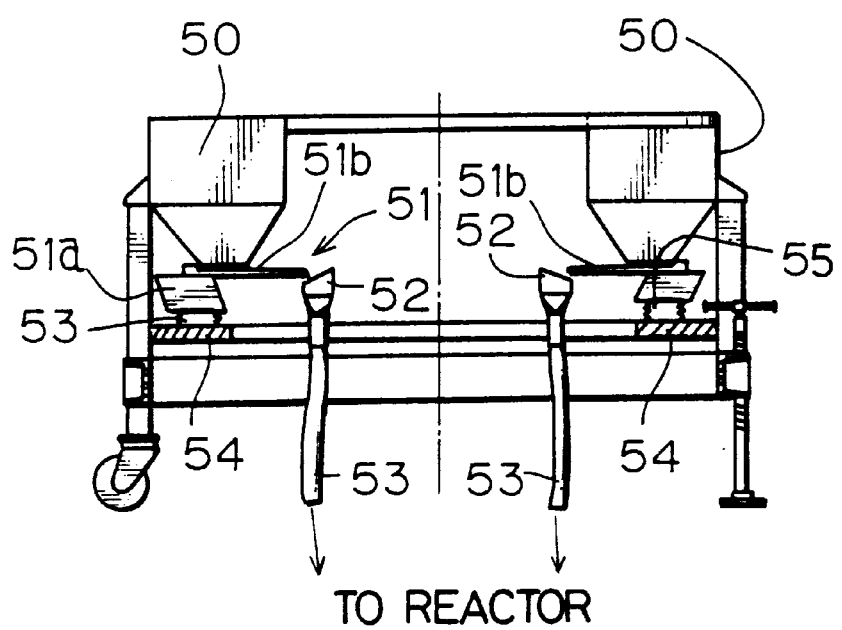

As shown in FIG. 4, there are formed a number of holes 3e in each passage 3a formed at its outlet (i.e., upstream of the guideway in the direction in which the granular catalyst is carried). These holes 3e serve as openings of a sieve which allows powdery waste of the granular catalyst produced during its feeding operation to pass through and drop. The holes 3e are made by punching sheet metal. Provision of the holes 3e serves to prevent accumulation of powdery waste in the individual passages 3a and ensure smooth movement of the granular catalyst. Furthermore, there is provided a waste collecting bin 3f underneath the holes 3e for collecting the powdery waste which has dropped through the holes 3e (see FIG. 1A). When the waste collecting bin 3f has become full, an operator can remove it and dispose of the powdery waste.

The holes 3e need not necessarily be perforations punched in metallic parts, but may be formed of slit-like openings, for instance. In practice, openings of any form may be employed as far as they allow the granular catalyst to pass therethrough and the powdery waste to fall off the passages 3a without reaching the through holes 3c. The trough 3 thus provided with the holes 3e acts as a sieve when vibrated.

Generally, the hopper 2, the trough 3, the partitions 5, the compartments 6 and the first and seconds plates 7, 9 are constructed of various kinds of sheet metal or hardening resin and the like. When producing them from sheet metal, it is desirable to use stainless steel, for instance, which has excellent corrosion-resisting and chemical-resisting properties. It is also desirable to reduce the frictional resistance of those component surfaces which come in contact with the granular catalyst when it is transferred. More particularly, contact surfaces of the passages 3a of the trough 3, the partitions 5 and the compartments 6 are preferably coated with Teflon (trademark of Dupont Co., polytetrafluoroethylene (PTFE)), covered by sheets of Teflon or other suitable materials by sticking them, or polished to provide low frictional resistance, although ordinary surface finish would generally be sufficient.

The vibrator 4 is installed on the mobile platform 12, which is mounted on casters 11, by way of coil springs 13 and a base frame 14. The trough 3 is fixed to the top surface of the vibrator 4. While a commercially available vibrator may be employed as the vibrator 4, it should preferably be of an electromagnetic type using an electromagnet. This is because the frequency of vibration can be controlled by varying a voltage applied to the electromagnet. Vibrators based on any other suitable vibrating methods may be adopted as the vibrator 4, including a vibrator incorporating an eccentric motor known as so-called vibromotor or a pneumatic vibrator in which a piston is reciprocated by alternately switching the direction of air supply by means of an electromagnetic valve, for example. Preferably, the vibrator 4 is to produce vibration acting on the trough 3 in its obliquely upward direction.

Referring to FIG. 1, the numeral 15 designates a control panel for controlling the operation of the vibrator 4 and the numeral 16 designates a junction box.

The following discussion deals with the operation of the catalyst charger thus constructed, in which it is assumed that the individual sleeves 3*d* are already connected to corresponding reaction tubes of the reactor by the pipes P.

The vibrator 4 is activated by turning on a power switch provided on the control panel 15 after the individual compartments 6 of the hopper 2 have been loaded with appropriate amounts of granular catalyst. As the vibrator 4 vibrates the trough 3, the granular catalyst in the hopper 2 is fed into the passages 3*a* at a delivery rate regulated by the gate plates 7 and 9.

Since the vibration produced by the vibrator 4 acts on the trough 3 in its obliquely upward direction, the granular catalyst fed into the passages 3*a* is smoothly conveyed in the direction shown by an arrow C without being subjected to excessive vibration.

Although a small amount of powdery waste is produced from the granular catalyst as it is conveyed toward the outlets of the passages 3*a* of the trough 3, the unwanted powdery waste is cleared from the passage 3*a* as it drops through the holes 3*e*. Thus, only solid masses of the granular catalyst are selectively carried up to the sleeve 3*d* at the guideway of each passage 3*a*. The granular catalyst which continuously falls through the sleeves 3*d* at a controlled, relatively small feeding rate is charged into the reaction tubes through the pipes P.

Although the gate is formed of the two gate plates in this embodiment, it may be formed of one or more than two gate plates. The height of each gate plate is preferably adjusted in accordance with such conditions as the shape and size of the granular catalyst as well as its feeding rate. Although the height of each gate plate is manually adjusted in the foregoing embodiment, height adjustment may be automated by incorporating a stepping motor and a gear mechanism, for instance.

The invention is not limited to catalyst chargers for feeding a granular catalyst to a reactor, like the one described above, but is applicable to an apparatus for feeding a granular material onto a large-width conveyor, for instance, should there be provided a hopper having a single discharge port and a fan-shaped trough located beneath the discharge port of the hopper. Such a granular material feeding apparatus can be adapted to uniformly feed granular materials to a wide variety of destination by changing the shape of its trough.

Industrial Applicability

As is obvious from the above description, according to the present invention, a granular material can be feed to a destination such as a reactor at a constant feeding rate by use of a simple granular material conveying mechanism. The present invention is especially suitable for uniformly charging a catalyst.

What is claimed is:

1. A method of feeding a granular material to a specific destination comprising the steps of:
    discharging a granular material loaded in a hopper onto a trough which is disposed approximately in a horizontal position and extends from a vicinity of a discharge port of the hopper;
    conveying the granular material on the trough up to the destination by vibrating the trough; and
    allowing powder waste of the granular material generated during delivery of the granular material to the destination to fall down through a sieve formed in the trough; wherein the granular material is delivered to the destination in a uniform condition by controlling a frequency of vibration of the trough while regulating a rate at which the granular material is discharged from the hopper by adjusting an opening of a gate.

2. A method of feeding the granular material according to claim 1, wherein the trough is caused to vibrate by the vibrator in its obliquely upward direction.

3. A method of feeding the granular material according to claim 1, wherein the trough includes a plurality of passages disposed approximately in a horizontal position and extending from the vicinity of the discharge port of the hopper.

4. An apparatus for feeding a granular material to a plurality of specific destinations, comprising:
    a hopper configured to store a granular material;
    a trough disposed approximately in a horizontal position and extending from a vicinity of a discharge port of the hopper;
    a sieve formed in the trough and configured to allow powdery waste of the granular material generated during delivery of the granular material to the destinations to fall down;
    a vibrator configured to cause the trough to vibrate whereby the granular material discharged from a downstream end of the trough is delivered to the destinations; and
    a gate provided at the discharge port of the hopper, said gate regulating a rate at which the granular material is discharged from the hopper onto the trough;
    wherein the vibrator is constructed so as to support a plurality of passages in the trough and vibrate the passages in common.

5. A granular material feeding apparatus according to claim 4, wherein the hopper is provided with partitions configured to divide an internal space of the hopper into the same number of storage compartments as the passages in the trough.

6. A granular material feeding apparatus according to claim 4, wherein the sieve is formed in the trough upstream of an outlet configured to drop powdery waste of the granular material produced during the feeding.

7. A granular material feeding apparatus according to claim 3, wherein the trough is caused to vibrate by the vibrator in its obliquely upward direction.

8. A granular material feeding apparatus according to claim 5, wherein the sieve is formed in the trough upstream of an outlet configured to drop powdery waste of the granular material produced during the feeding.

9. A granular material feeding apparatus according to claim 4, wherein the trough is caused to vibrate by the vibrator in its obliquely upward direction.

10. A granular material feeding apparatus according to claim 5, wherein the trough is caused to vibrate by the vibrator in its obliquely upward direction.

11. A granular material feeding apparatus according to claim 4, wherein the trough has the plurality of passages disposed approximately in a horizontal position and extending from the vicinity of the discharge port of the hopper.

12. A method of feeding the granular material according to claim 3, wherein the sieve is formed in each of the plurality of passages.

13. A granular material feeding apparatus according to claim 11, wherein the sieve is formed in each of the plurality of passages.

14. A method of feeding the granular material according to claim 12, wherein the sieve is formed in each of the plurality of passages upstream of an outlet.

15. A granular material feeding apparatus according to claim 13, wherein the sieve is formed in each of the plurality of passages upstream of an outlet.

16. A method of feeding the granular material according to claim 10, wherein the hopper is provided with partitions configured to divide a space of the hopper into a plurality of storage compartments corresponding in number to the plurality of passages in the trough.

17. A granular material feeding apparatus according to claim 11, wherein the hopper is provided with partitions configured to divide a space of the hopper into a plurality of storage compartments corresponding in number to the plurality of passages in the trough.

18. A method of feeding a granular material to a plurality of specific destinations by discharging the granular material loaded in a hopper onto a trough which includes a plurality of passages disposed approximately in a horizontal position and extending from a vicinity of a discharge port of the hopper, and by conveying the granular material on the trough up to the plurality of destinations by vibrating the trough, said method comprising the steps of:

regulating a rate at which the granular material is discharged from the hopper onto the trough by adjusting an opening of a gate which is provided at the discharge port of the hopper and is movable up and down;

causing the trough to vibrate by a vibrator supporting the plurality of passages of the trough in common; and allowing powdery waste of the granular material generated during delivery of the granular material to the plurality of destinations to fall down through a sieve formed in the trough;

whereby the granular material discharged onto the trough is delivered to the plurality of destinations in a uniform condition.

19. A method of feeding the granular material according to claim 18, wherein the trough is caused to vibrate by the vibrator in an obliquely upward direction.

20. An apparatus for feeding a granular material to a plurality of specific destinations, comprising:

a hopper configured to store a granular material;

a trough including a plurality of passages disposed approximately in a horizontal position and extending from a vicinity of a discharge port of the hopper; and a vibrator configured to cause the trough to vibrate so that the granular material discharged from a downstream end of the trough is delivered to the destinations;

wherein a gate is provided at the discharge port of the hopper for regulating the rate at which the granular material is discharged from the hopper onto the trough;

wherein the vibrator is constructed so as to support the plurality of the passages of the trough and vibrate the passages in common; and wherein a sieve is formed in the trough upstream of an outlet configured to drop powdery waste of the granular material produced during the feeding.

21. A granular material feeding apparatus according to claim 20, wherein the hopper is provided with partitions configured to divide an internal space into the same number of storage compartments as the passages of the trough.

22. A granular material feeding apparatus according to claim 20, wherein the trough is caused to vibrate by the vibrator in an obliquely upward direction.

* * * * *